United States Patent
Mahadik et al.

(10) Patent No.: US 8,024,473 B1
(45) Date of Patent: Sep. 20, 2011

(54) SYSTEM, METHOD, AND COMPUTER PROGRAM PRODUCT TO AUTOMATE THE FLAGGING OF OBSCURE NETWORK FLOWS AS AT LEAST POTENTIALLY UNWANTED

(75) Inventors: Vinay A. Mahadik, San Jose, CA (US); Zheng Bu, Fremont, CA (US)

(73) Assignee: McAfee, Inc., Santa Clara, CA (US)

( * ) Notice: Subject to any disclaimer, the term of this patent is extended or adjusted under 35 U.S.C. 154(b) by 165 days.

(21) Appl. No.: 11/780,448

(22) Filed: Jul. 19, 2007

(51) Int. Cl.
*G06F 15/16* (2006.01)
*G06F 15/173* (2006.01)

(52) U.S. Cl. .................... 709/230; 709/225
(58) Field of Classification Search .............. 709/230, 709/225
See application file for complete search history.

(56) References Cited

U.S. PATENT DOCUMENTS

| | | | |
|---|---|---|---|
| 5,530,703 A * | 6/1996 | Liu et al. | 370/255 |
| 5,983,270 A * | 11/1999 | Abraham et al. | 709/224 |
| 6,412,000 B1 * | 6/2002 | Riddle et al. | 709/224 |
| 6,424,624 B1 * | 7/2002 | Galand et al. | 370/231 |
| 6,434,624 B1 * | 8/2002 | Gai et al. | 709/232 |
| 6,687,732 B1 * | 2/2004 | Bector et al. | 709/200 |
| 6,757,727 B1 * | 6/2004 | Ivory | 709/224 |
| 6,775,284 B1 * | 8/2004 | Calvignac et al. | 370/392 |
| 6,839,751 B1 * | 1/2005 | Dietz et al. | 709/224 |
| 7,187,694 B1 * | 3/2007 | Liao | 370/474 |
| 2002/0080726 A1 * | 6/2002 | Klassen et al. | 370/252 |
| 2002/0186661 A1 * | 12/2002 | Santiago et al. | 370/252 |
| 2004/0034800 A1 * | 2/2004 | Singhal et al. | 713/201 |
| 2004/0039820 A1 * | 2/2004 | Colby et al. | 709/226 |
| 2004/0081196 A1 * | 4/2004 | Elliott | 370/465 |
| 2004/0215647 A1 * | 10/2004 | Farn et al. | 707/101 |
| 2005/0050334 A1 * | 3/2005 | Liang et al. | 713/188 |
| 2006/0133280 A1 | 6/2006 | Natchu | 370/235 |
| 2007/0033645 A1 | 2/2007 | Jones | 726/12 |
| 2007/0192863 A1 * | 8/2007 | Kapoor et al. | 726/23 |
| 2008/0080518 A1 * | 4/2008 | Hoeflin et al. | 370/395.42 |

OTHER PUBLICATIONS

"GRID today P2P Killer", http://www.digital-digest.com/news-60448.html, Mar. 14, 2007.
"The elephant in the room is under a blanket . . . ", http://dvlabs.tippingpoint.com/blog/1023/The-elephant-in-the-room-is-under-a-blanket, Jul. 18, 2007.
Black Hat USA 2007, http://www.blackhat.com/html/bh-usa-07/bh-usa-07-speakers.html#Dhamankar, printed Jul. 19, 2007.

* cited by examiner

*Primary Examiner* — Krisna Lim
(74) *Attorney, Agent, or Firm* — Wong, Cabello, Lutsch, Rutherford & Brucculeri, L.L.P.

(57) ABSTRACT

A system, method, and computer program product are provided for flagging a network flow as at least potentially unwanted. In use, a network flow is identified as utilizing an unknown protocol. Further, the network flow is flagged as at least potentially unwanted.

22 Claims, 7 Drawing Sheets

SYSTEM, METHOD, AND COMPUTER PROGRAM PRODUCT TO AUTOMATE THE FLAGGING OF OBSCURE NETWORK FLOWS AS AT LEAST POTENTIALLY UNWANTED

FIELD OF THE INVENTION

The present invention relates to network flow management, and more particularly to managing network flows that utilize unknown, potentially obscured protocols.

BACKGROUND

In traditional network flow management systems, network flows have been identified based on known protocol types. For example, such network flows are often classified based on known good and known bad protocols, for management purposes. However, identifying network flows based merely on known good and known bad protocols has generally exhibited various limitations. Just by way of example, identifying network flows based on known good and known bad protocols is sometimes ineffective in managing network flows in peer-to-peer systems. This has occasionally been because peer-to-peer systems deploy various levels of protocol obfuscations, encryption, and other advanced stealth techniques specifically to evade firewalls and network traffic shaping devices from classifying them as known bad. Given the lack of traffic-shaping of these file-sharing protocols, a large fraction of the network bandwidth, in an enterprise or ISP environment, is consumed by these obscure protocols.

There is thus a need for addressing these and/or other issues associated with the prior art.

SUMMARY

A system, method, and computer program product are provided to automate the flagging of obscure network flows as at least potentially unwanted. In use, a network flow is identified as utilizing an unknown (e.g. obscured, etc.) protocol. Further, the network flow is flagged as at least potentially unwanted.

DETAILED DESCRIPTION

Figure 1:
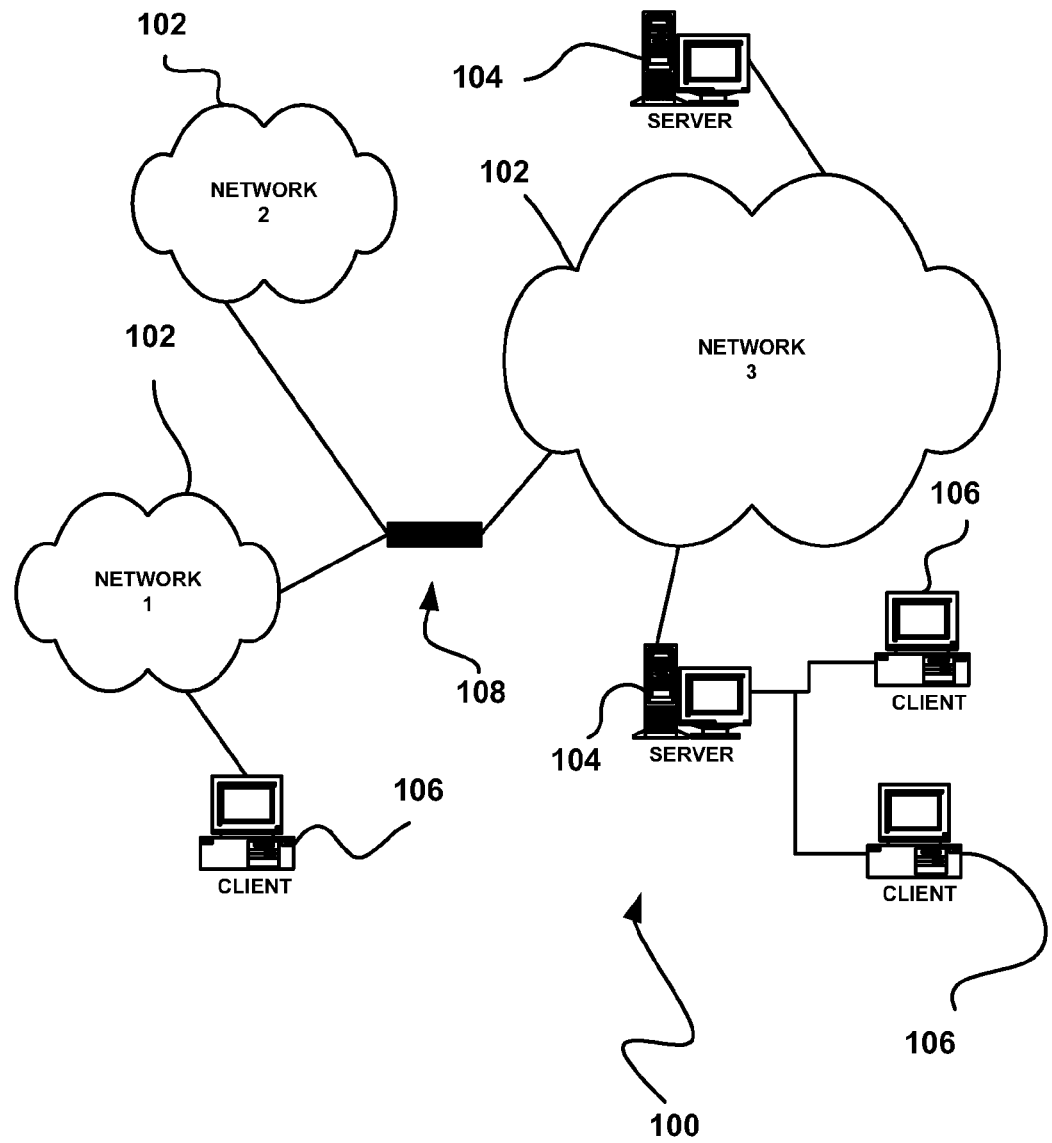
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
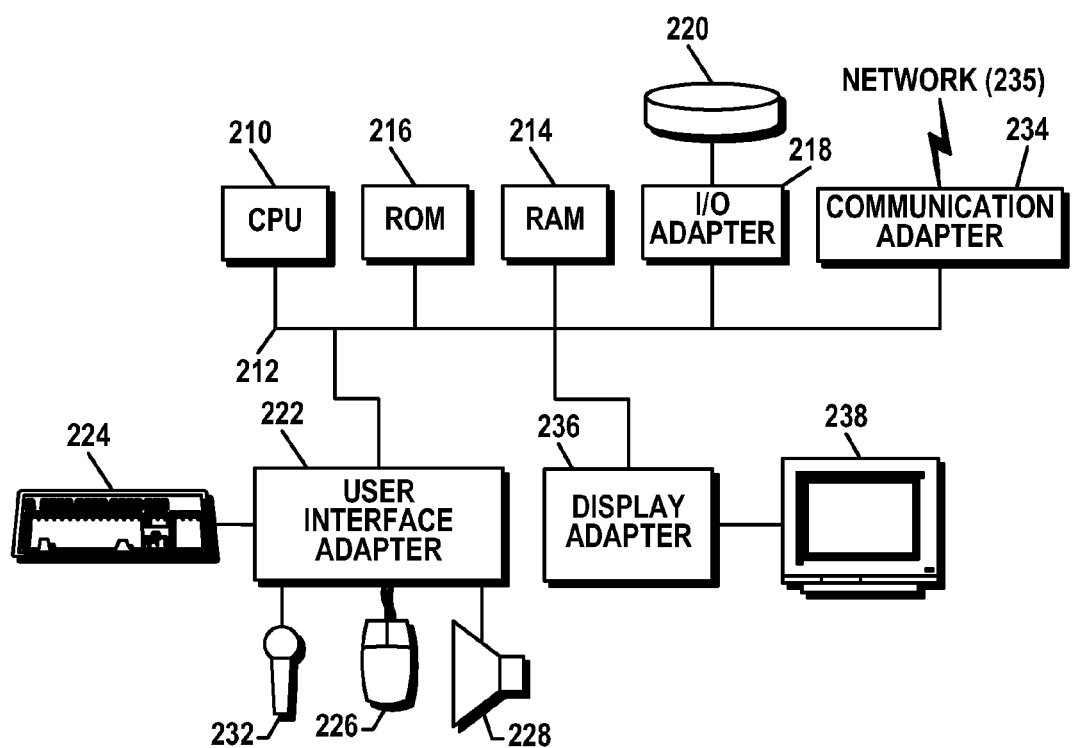
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
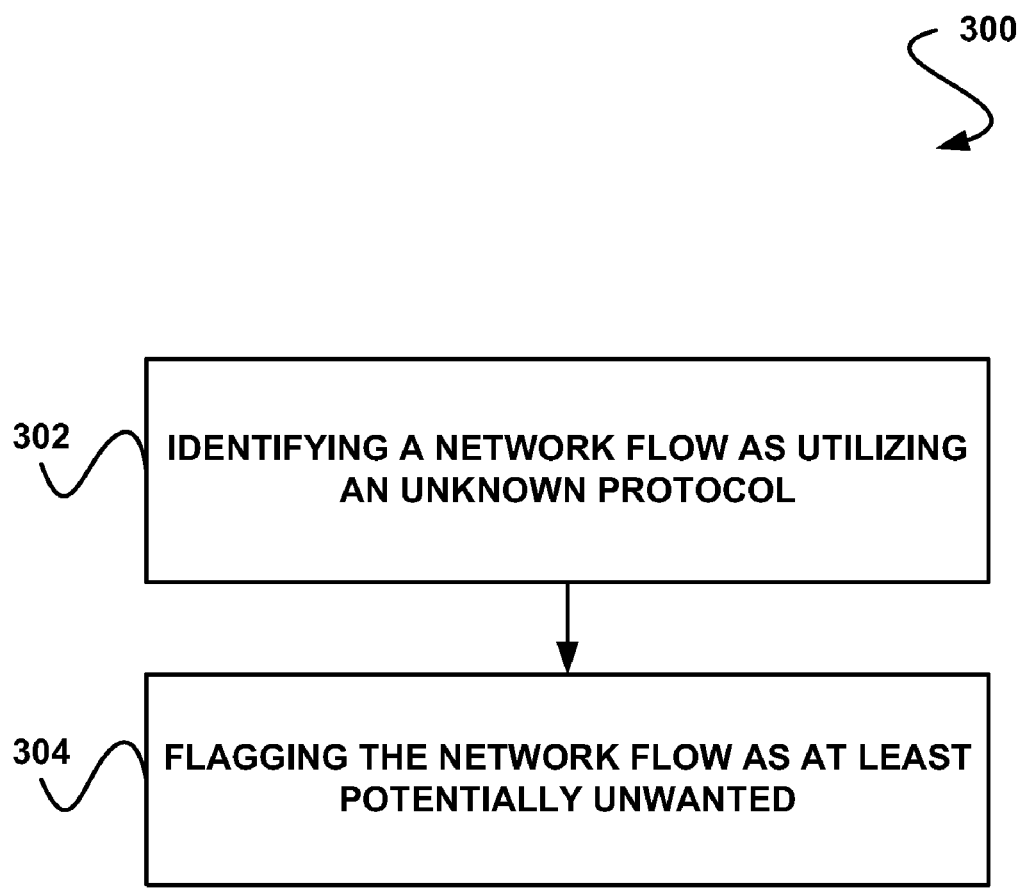
FIG. 3 shows a method for flagging a network flow as at least potentially unwanted, in accordance with one embodiment.

FIG. 3 shows a method 300 for flagging a network flow as at least potentially unwanted, in accordance with one embodiment. As an option, the method 300 may be carried out in the context of the architecture and environment of FIGS. 1 and/or 2. Of course, however, the method 300 may be carried out in any desired environment.

As shown in operation 302, a network flow is identified as utilizing an unknown protocol. In the context of the present description, the network flow may include any flow capable of being utilized for transmitting data over a network. For example, the network flow may include a network packet, a plurality of network packets, a series of network packets, etc. Furthermore, the network packet may include an internet protocol (IP) packet, a user datagram protocol (UDP) packet, or any other format capable of representing information.

In one embodiment, the network flow may be exchanged between one or more parties over the network. For example, one party may be a client and at least one other party may be a server. In one embodiment, the client and/or server may include any of the devices described above with respect to FIGS. 1 and/or 2. Of course, other embodiments are contemplated where the two parties include two clients (e.g. in a peer-to-peer environment, etc.), two servers, etc. In addition, the network on which the network flow is identified may include any of the networks described above with respect to FIG. 1, but of course may also include any other type of network on which a network flow may be identified.

Additionally, the data may include a request, a response, a file, or any other information capable of being transmitted via the network flow. For example, the file may include a portion of a file, partial information, etc. Of course, however, the data may include any information, content, etc. capable of being transmitted over the network utilizing the network flow.

In the context of the present description, the unknown protocol may include any protocol that is not necessarily known. Examples of unknown protocols and techniques for identifying the same will now be set forth.

In one embodiment, the unknown protocol utilized by the network flow may include a non-standard protocol. In such embodiment, the non-standard protocol may be excluded from a predetermined list of standard protocols. For example, the standard protocols may include protocols such as Hypertext Transfer Protocol (HTTP), File Transfer Protocol (FTP), Teletype Network (TELNET), Secure Sockets Layer (SSL), Secure Shell (SSH), Simple Mail Transfer Protocol (SMTP), and/or any other predetermined protocols.

In one embodiment, the predetermined list of standard protocols may include a list of protocols manually determined by a user, an administrator, etc. In another embodiment, the predetermined list of standard protocols may be automatically determined from any source of information capable of providing protocol information. For example, the predetermined list of standard protocols may be automatically determined based on signatures, logs, documents, etc. Still yet, in another embodiment, the predetermined list of standard protocols may be read from a configuration file, a database, memory, etc.

In addition, the unknown protocol may include an unidentified byte pattern. Just by way of example, an identified byte pattern may include a sequence of bytes, etc. associated with a known protocol. Thus, the unidentified byte pattern may not be associated with (e.g. match, etc.) the identified byte pattern. For example, an unidentified byte pattern may be associated with a protocol that may be propertiary, unknown, etc.

In addition, the unknown protocol may include a protocol that contains characters that are not part of the printable character-set of the American Standard Code for Information Interchange (ASCII). For example, the unknown protocol may include a protocol that is not purely ASCII-only. In one embodiment, ASCII only protocols may only include printable ASCII characters with byte values less than or equal to 127 in decimal, or 0x7F in hex. Thus, in such embodiment, the unknown protocol may include a non-printable protocol that includes non-printable (i.e. non-ASCII) characters with byte values greater than 127 in decimal, or 0x7F in hex.

In one embodiment, the non-printable protocol (i.e. the non ASCII-only protocol or "binary" protocol) may be identified based on a start of the network flow. For example, it may be determined whether a threshold portion of a beginning of the network flow includes a predetermined amount (e.g. 1, etc.) of non-printable characters. In another embodiment, the binary/non-printable protocol may be identified based on any other portion or even all of the network flow.

Additionally, in one embodiment, the network flow may be identified as utilizing the unknown protocol if it is determined that the network flow transfers at least a threshold amount of data. The threshold amount of data may be predefined (e.g. manually, etc.), for example. Furthermore, the threshold amount of data may optionally be transmitted in a single direction. For example, the network flow may be identified as utilizing the unknown protocol, if it is determined that the network flow transmits the threshold amount of data in a single direction (e.g. to the server, from the server, etc.).

In still yet another embodiment, the network flow may be further identified as utilizing an unknown protocol if it is determined that the network flow includes a non-interactive flow. The non-interactive flow may include a data flow where a user is not manually entering (e.g. typing in) data to be transmitted. For example, the non-interactive flow may include a least a portion of a file transfer.

As shown in operation 304, the network flow is flagged as at least potentially unwanted. Optionally, the network flow may be flagged as at least potentially unwanted, in response to the identification of the network flow as utilizing the unknown protocol. In this way, use of an unknown protocol by a network flow may indicate that the network flow is at least potentially unwanted (e.g. that the network flow at least potentially includes malware, that the network flow is at least potentially being utilized for improper peer-to-peer data sharing, that the network flow is attempting to hide/obfuscate contents, that the network flow is a stealth backdoor into the network, that the network flow is a high-bandwidth proprietary protocol network administrators should be aware of, etc.).

In one embodiment, flagging the network flow may include indicating that the network flow is at least potentially unwanted. For example, the network flow may be flagged by setting a bit associated with the network flow, attaching an indicator to the network flow, etc. Thus, such flagging may be accomplished using a data structure that may or may not necessarily be attached to the flow, etc. For example, DiffServ (Differentiated Services) code points or 802.1P tagging of each network packet of the network flow may be utilized for accomplishing the flagging. Of course, however, the network flow may be flagged as being at least potentially unwanted in any desired manner.

In this way, a network flow identified as utilizing an unknown protocol may be flagged as at least potentially unwanted. Optionally, an action may be performed on the network flow in response to the flagging thereof. For example, a rate limit may be applied to the flagged network flow, an analysis may be performed on the flagged network flow, etc. In one optional embodiment, the rate-limit may be applied by a tagging device. In another optional embodiment, the rate limit may be applied by a downstream network traffic shaping device that uses quality-of-service tags from an upstream tagging device.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
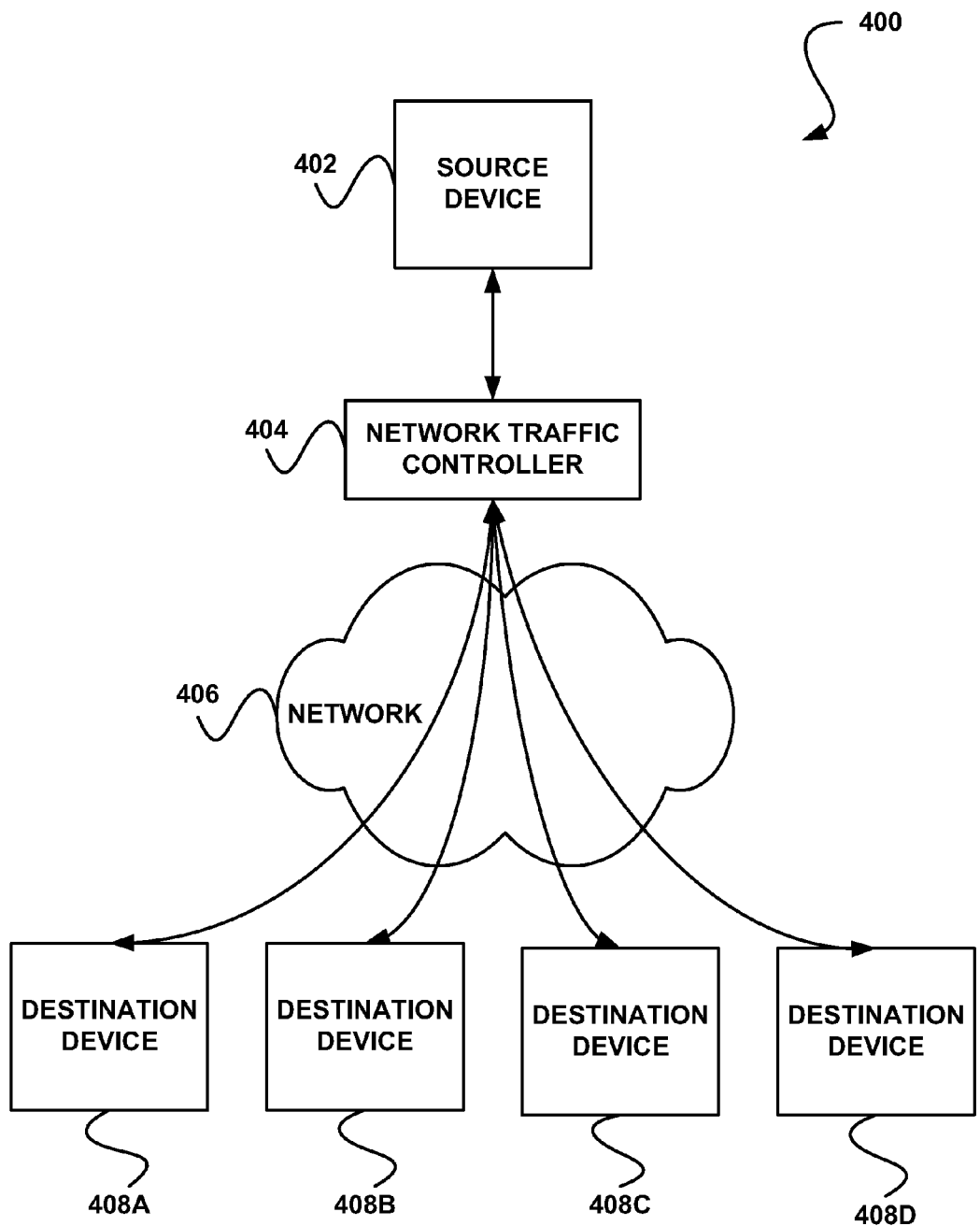
FIG. 4 shows a system for flagging a network flow as at least potentially unwanted, in accordance with another embodiment.

FIG. 4 shows a system 400 for flagging a network flow as at least potentially unwanted, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, the system 400 may include a plurality of destination devices 408A-D. In addition, the destination devices 408A-D are in communication with a source device 402 via a network 406 (e.g. Internet, etc). Thus, the destination devices 408A-D may include any devices capable of being in communication with the network 406. For example, the destination devices 408A-D may include clients.

As also shown, the source device 402 is in communication with the network 406 via a network traffic controller 404. The source device 402 may include any device capable of communicating over the network 406 via the network traffic controller 404. Just by way of example, the source device 402 may include a peer-to-peer (p2p) client. To this end, the source device 402 may not necessarily be directly coupled to the network 406, as an option.

In one embodiment, the source device 402 may initiate a network flow from the destination devices 408A-D. For example, the source device 402 may send a request to any of the destination devices 408A-D for data. Accordingly, the destination devices 408A-D may transmit the requested data to the source device 402 utilizing the network flow. Of course, however, the destination devices 408A-D may also initiate the network flow from the source device 402, in another embodiment.

In one embodiment, the network traffic controller 404 may process the network flow between the source device 402 and the destination devices 408A-D. For example, the network traffic controller 404 may identify characteristics of the network flow and compare such characteristics to predetermined characteristics. Furthermore, in another embodiment, the network traffic controller 404 may identify the network flow as utilizing an unknown protocol (e.g. based on the comparison, etc.). In yet another embodiment, the network traffic controller 404 may flag the network flow as at least potentially unwanted. Such network flow may be flagged as at least potentially unwanted, in response to the identification of the network flow as utilizing an unknown protocol, as an option.

In this way, in the context of the present embodiment, the network traffic controller 404 may include any device capable of processing (e.g. analyzing, etc.) the network flow. In one embodiment, the network traffic controller may include a processor. For example, in various embodiments, the network traffic controller may include any of the devices described above with respect to FIGS. 1 and/or 2.

Furthermore, as an option, the network traffic controller 404 may apply a rate limit to the flagged network traffic flow. In one embodiment, the rate limit may control (e.g. limit, etc.) the amount of network traffic (e.g. packets, etc.) sent and/or received utilizing the source device 402 and/or any of the destination devices 408A-D. As an option, the rate limit may be applied for a predetermined time period. As another option, the rate limit may allow network traffic that is less than or equal to a predetermined rate to be sent, whereas network traffic that exceeds the predetermined rate may be dropped, delayed, etc.

In another embodiment, the network traffic controller 404 may apply a priority of the flagged network flow. Such priority may optionally be lower than a priority of non-flagged network flow that has been identified as utilizing known good protocols (e.g. HTTP, SSL, TELNET, SSH, FTP, etc.), as an option. Still yet, in yet another embodiment, the network traffic controller 404 may apply a priority to the flagged network flow that is higher than a priority of non-flagged network flows that have been identified as utilizing known bad protocols (e.g. peer-to-peer file sharing protocol, an encrypted peer-to-peer file protocol, etc.).

Figure 5A:
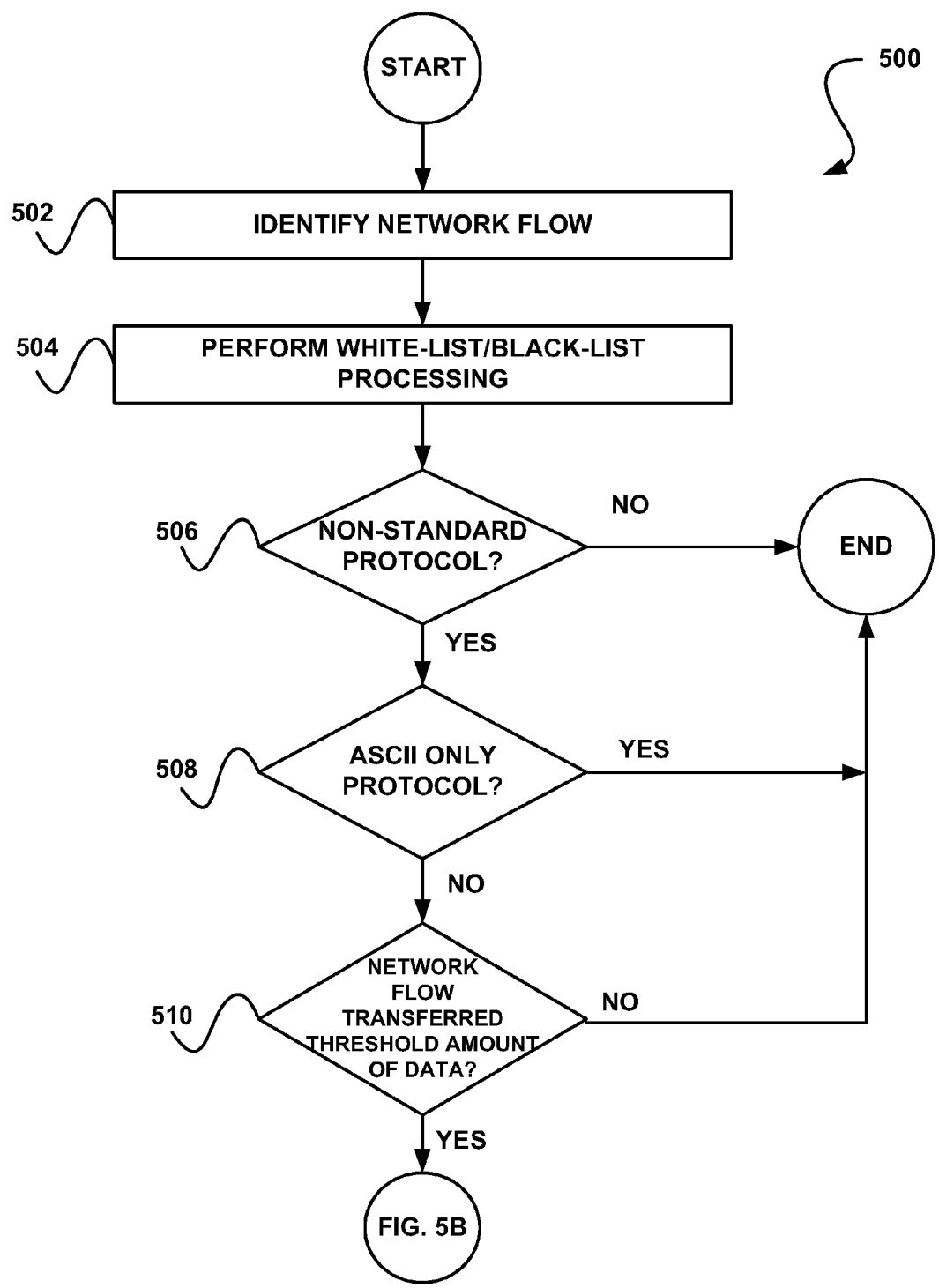
FIGS. 5A-B show a method for identifying a network flow as utilizing an unknown protocol, in accordance with yet another embodiment.
Figure 5B:
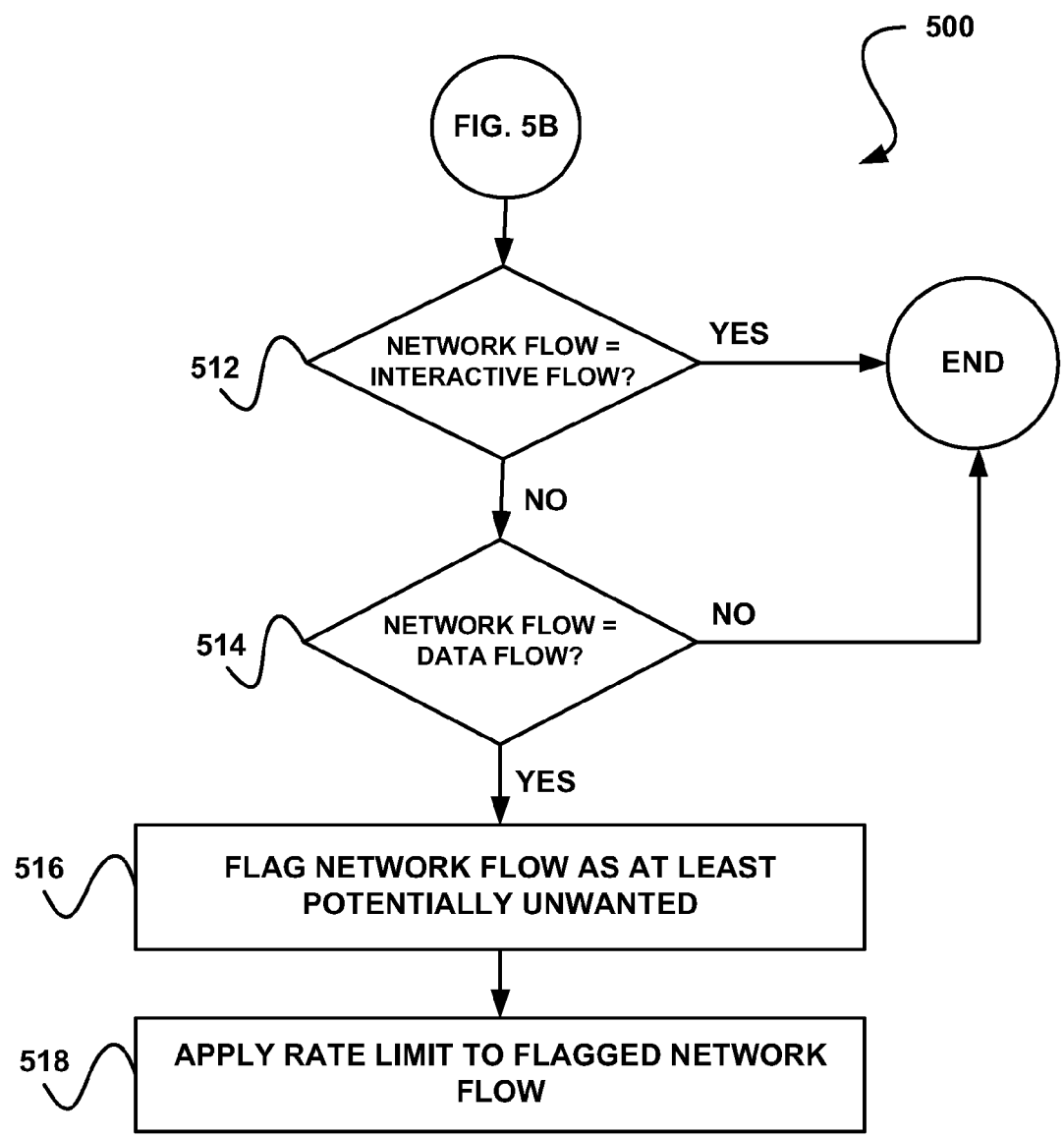

FIGS. 5A-B show a method 500 for identifying a network flow as utilizing an unknown protocol, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

As shown in operation 502, a network flow is identified. For example, a plurality of network packets communicated between a source and a destination (e.g. source device 402, destination devices 408A-D of FIG. 4) may be identified as a network flow between such source and destination. Optionally, the network flow may include network packets that are associated with one another (e.g. included within a single session, etc.). In one embodiment, the network flow may be identified by a network traffic controller (e.g. network traffic controller 404) in communication with a network on which the network flow is identified.

In one embodiment, the network traffic controller may include a list of signatures for standard protocols (e.g. HTTP, FTP, SSL, Telnet, SSH, instant messenger traffic, identified proprietary protocols, etc.). As an option, the list of signatures may include standard protocols that the network traffic controller has previously processed, parsed, blocked, rate-limited, etc. In another embodiment, the list of signatures may include a white-list (e.g. known good, wanted, etc. protocols) and/or a black-list (e.g. known bad, unwanted, etc. protocols) of protocol signatures. In another embodiment, the list of signatures may be constantly updated, updated on a schedule, or via any other process capable of keeping signatures up-to-date.

In addition, white-list and black-list processing is performed on the identified network flow, as shown in operation 504. For example, the white-list and black-list processing may include comparing the network flow, or a characteristic thereof, to the list of signatures for the standard protocols. Thus, in one embodiment, a protocol utilized by the network flow may be compared to the white-list of protocol signatures. In one embodiment, the protocol utilized by the network flow may optionally be determined based on a byte sequence associated with the network flow. If the protocol utilized by the network flow matches any protocol signatures in the white-list, the network flow may be identified as utilizing a known good protocol.

In another embodiment, the protocol utilized by the network flow may be compared to the black-list of protocol signatures. If the protocol utilized by the network flow matches any protocol signatures in the black-list, the network flow may be identified as utilizing a known bad protocol. If it is determined that the protocol utilized by the network flow does not match protocol signatures in the white-list or black-list, the network flow may be identified as utilizing a non-standard protocol. See decision 506.

Thereafter, it may be further determined whether the non-standard protocol is an unknown protocol, as will now be described. Specifically, if it is determined that the network flow utilizes a non-standard protocol, it is determined whether the protocol utilized by the network flow is an ASCII only protocol (e.g. HTTP headers, etc.). Note decision 508. In one embodiment, an ASCII only protocol may only include ASCII printable characters (e.g. HTTP protocol request headers, etc.). For example, ASCII printable characters may include byte values less than or equal to 127 in decimal, or 0x7F in hex.

For example, obfuscated and/or encrypted protocols may include non-ASCII/non-printable characters. In one embodiment, a byte value of data in a network flow may range from 0 to 255. In another embodiment, a network flow including encrypted data may have packets with byte values randomly distributed over the entire 0 to 255 byte range. Thus, in accordance with the current example, a randomly sampled byte location may have a certain chance of being a non-printable/non-ASCII/"binary" character.

Table 1 illustrates such random sampling in accordance with the present example. It should be noted that the random sampling shown in Table 1 is set forth for illustrative purposes only, and thus should not be construed as limiting in any manner.

TABLE 1

| Sample Size (N) | Formula: $100 * (1 - 0.5\textasciicircum N)$ | Percent Chance of Non-Printable |
| --- | --- | --- |
| 1 | $100 * (1 - 0.5\textasciicircum 1)$ | 50% |
| 2 | $100 * (1 - 0.5\textasciicircum 2)$ | 75% |
| 3 | $100 * (1 - 0.5\textasciicircum 3)$ | 87.5% |
| 10 | $100 * (1 - 0.5\textasciicircum 10)$ | 99.9% |

As an option, a network flow including a substantial (e.g. predetermined, etc.) density of non-printable ASCII characters may be a characteristic of the network flow utilizing an unknown protocol. Still yet, in another embodiment, the start of the network flow may be utilized for determining if the network flow includes non-printable ASCII characters. In yet another embodiment, any time period associated with the network flow (e.g. middle, end, etc.) may be utilized for determining if the network flow includes non-printable ASCII characters.

If it is determined that the protocol utilized by the network flow is a non ASCII-only protocol (i.e. a binary or non-printable protocol), it is determined if at least a threshold amount of data has been transmitted via the network flow. Note decision 510. In one embodiment, such determination may be made with respect to a single direction. For example, the single direction may be directed towards a source that initiated the network flow or from a destination that received a network flow initiation request. In use, a network flow that has transmitted at least a threshold amount of data in the single (e.g. response, request, etc.) direction may be a characteristic of the network flow utilizing an unknown protocol.

For example, an efficient peer-to-peer implementation may require each serving p2p-node to serve a substantially (e.g. predetermined, etc.) sized portion of a file. Otherwise, the peer-to-peer system may spend more time connecting and disconnecting between the source and destination than with respect to the actual transmission of the portion of the file. To this end, the present decision 510 correlates a violation of this general principle as being indicative of an unknown protocol.

In one specific example, a popular p2p system BITTORRENT™ uses a file chunk size of 256 Kbytes. So this is the minimum size of a file-portion served by a given node in that system. Furthermore, in the context of the present example, each portion may be further apportioned, for network transfer purposes, into sub-portions [e.g. protocol datagram units (PDUs)] with a default size of 16 kilobytes. In this way, transmission of a single file chunk may involve approximately 16 kilobytes of data, which on certain networks (e.g. Ethernet, etc.), may result in utilization of 10 or more maximum transfer unit (MTU) sized data packets. So when a substantial portion of the file is transferred, at least a few 10 s of MTU-sized packets are seen on the network.

In response to a determination that the network flow has transferred a threshold amount of data, it is determined whether the network flow is an interactive flow. Note decision 512. In one embodiment, the network flow may be determined to be an interactive flow (e.g. SSH, TELNET, instant messenger, etc.) where packets associated with the network flow carry data entered by a user or data generated in response to such entered data. For example, data entered by user may include data typed, copied, etc. Furthermore, in an interactive flow, the exchange of data between the source and destination may be intermittent, limited in volume for any given data packet burst, etc. As an option, a non-interactive network flow may be a characteristic of network flow utilizing an unknown protocol.

If it is determined that the network flow is not an interactive flow, it is further determined whether the network flow is a data flow. Note decision 514. Such data flow may include an FTP download, HTTP download, peer-to-peer file block transfer, etc. In one embodiment, the data flow may include the destination transferring data as fast as possible to the source. Still yet, in another embodiment, the data flow may include the destination transferring at least a portion of a file to the source. As an option, the network flow including a data flow may be a characteristic of the network flow utilizing an unknown protocol.

For example, some peer-to-peer clients may be coded as unprivileged user-space applications, and as such, may have no control over the packet-sizes for transmitting a burst of network packets. In addition, in the context of the present example, the source may create network packets equal to the maximum size of the MTU of a connected network. As an option, the originating device may include an operating system, network socket, network adapter, etc. that may be utilized to create the network packet.

Furthermore, in the context of the current example, the transmitted packets may encounter a network with a smaller MTU, and as such, a connecting device (e.g. a router, etc.) may split the packets into smaller packets equal to the size of smaller MTU. Eventually, at the destination, the data flow traffic may appear as a series of equal sized packets for the duration of the data portion transfer.

In yet another example, a single data sub-portion transfer within a larger data portion transfer between a plurality of connecting devices on a route that has the same MTU at each device may appear as a series of MTU sized packets. Further, the last packet in the series may be a smaller packet including the remaining bytes for that data portion.

In one embodiment, a long lasting network flow with a burst of mostly (e.g. a predefined amount, etc.) large and equal-sized data packets may be associated with a data flow, and the size of those data packets may be the MTU for that route. As an option, a network flow including a majority of data packets matching the MTU of the route may be a characteristic of the network flow utilizing an unknown protocol.

In another embodiment, the routes may be dynamic, such that an algorithm (e.g. computer algorithm, etc.) may track the size of the largest data packet, and may utilize that size as a predetermined MTU. Furthermore, if at least a threshold number of packets have been identified as having the predetermined MTU, then there may be a high degree of certainty that the predetermined MTU represents the true path MTU of the route. As an option, the algorithm may be utilized to eliminate the need for a network administrator, user, etc. to configure a value for the path MTU. In this way, an algorithm may automatically calculate the path MTU of a route.

Table 2 illustrates computer code capable of being carried out for identifying a network flow as utilizing an unknown protocol. It should be noted that such computer code is set forth for illustrative purposes only, and thus should not be construed as limiting in any manner.

TABLE 2

```
/* Path MTU Discovery */
CurPktLen = GetCurPktLen();
If ( CurPktLen > GuessedPathMTU ){
    GuessedPathMTU = CurPktLen;
    MTUSizedLargePktCount = 0;
}
If ( CurPktLen == GuessedPathMTU ){
MTUSizedLargePktCount =
MTUSizedLargePktCount + 1;
}
TotalPktCount = TotalPktCount + 1;
/* Binary Protocol Detection */
ProtocolIsBinary = CheckNonPrintableChars();
/* Long-lasting Flow Detection */
If ( TotalPktCount > LARGE_ENOUGH_PKT_COUNT ){
    /* Data Flow Detection */
    If ( ( MTUSizedLargePktCount >
    SIGNIFICANT_FRACTION x TotalPktCount )
        && ( ProtocolIsBinary == TRUE ) ){
        FlagFlow();
    }
}
```

As shown in operation 516, if it is determined that the network flow is a data flow, the network flow is flagged as at least potentially unwanted. To this end, network flows not matching a white-list and black-list, transferring at least a threshold amount of data, including non-printable ASCII characters, including a data flow, and including a majority of data packets matching the MTU of the route may indicate that the network flow utilizes an unknown protocol. In another embodiment, network flows identified as utilizing an unknown protocol may be flagged as potentially unwanted. Still yet, in another embodiment, the flagged network flow may indicate that utilized unknown protocol is associated with a file transfer protocol, a peer-to-peer protocol, an encrypted peer-to-peer protocol, etc.

As shown in operation 518, a rate limit is applied to the flagged network flow. In one embodiment, the rate limit of the flagged network flow may be lower than that of network flows utilizing known good protocols, and higher than that of network flows utilizing known bad protocols. As another option, the rate limit may lower a priority of the flagged network flow. For example, the rate limit may prioritize the flagged network flow as at least potentially unwanted with a priority higher than flagged bad protocols and a priority lower than flagged good protocols.

For example, HTTP may be white-listed as a known good protocol, and BITTORRRENT™ may be black-listed as a known bad protocol. In the current example, a rate limited flagged network flow may have less priority than HTTP, and more than BITTORRRENT™. As an option, an administrator may provide a differentiated quality of network traffic based on a white-list, a black-list, and the flagging of network flows.

Figure 6:
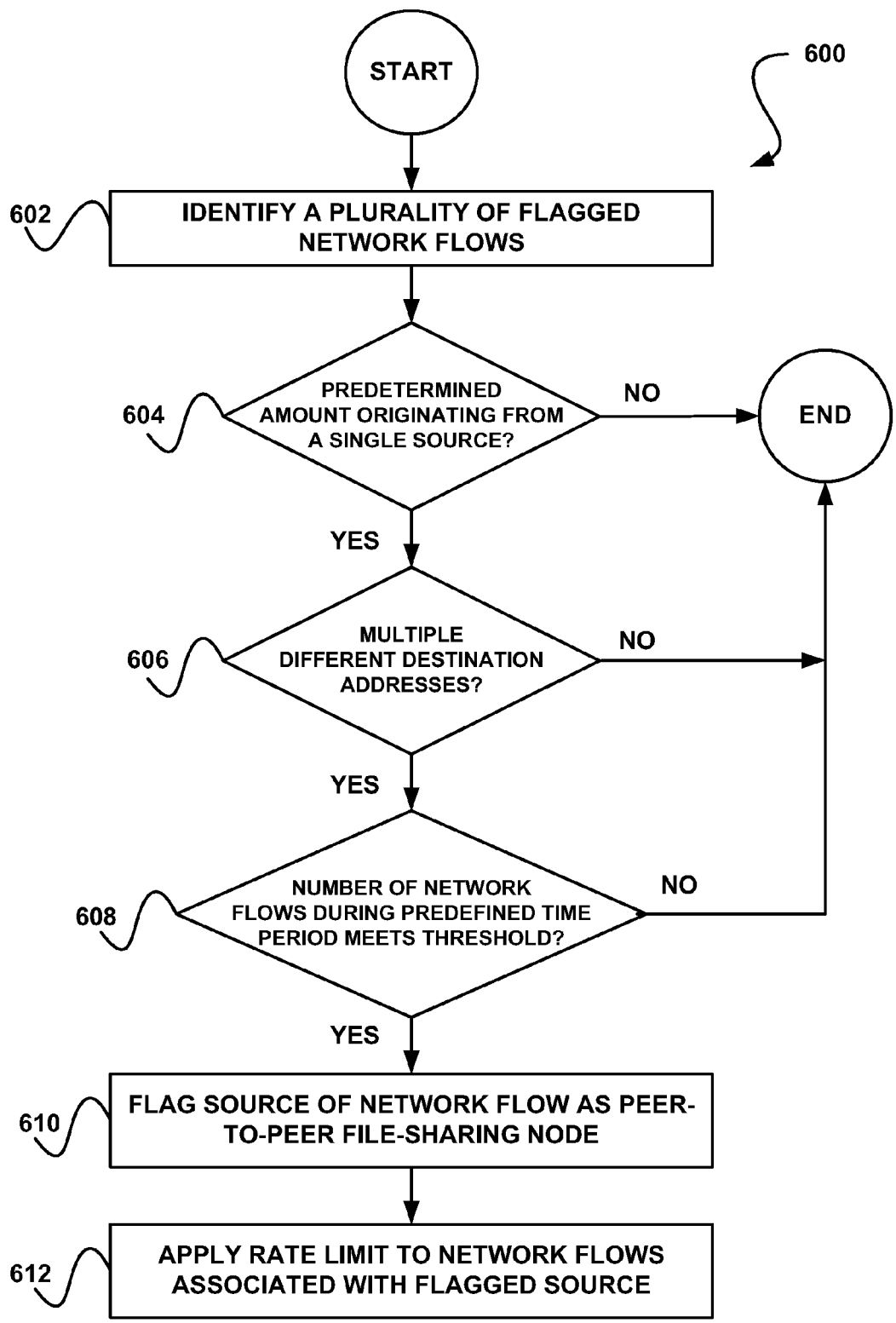
FIG. 6 shows a method for flagging a source of a network flow as a peer-to-peer file-sharing node, in accordance with still yet another embodiment.

FIG. 6 shows a method 600 for flagging a source of a network flow as a peer-to-peer file-sharing node, in accordance with still yet another embodiment. As an option, the method 600 may be carried out in the context of the architecture and environment of FIGS. 1-5B. Of course, however, the method 600 may be carried out in any desired environment. It should also be noted that the aforementioned definitions may apply during the present description.

As shown in operation 602, a plurality of flagged network flows is identified For example, a plurality of network packets may be identified as a network flow between a source and a destination. In yet another embodiment, the network flow may be identified by any of the devices described above with respect to FIGS. 1 and/or 2. Furthermore, in the context of the present embodiment, the source and destination may include any device capable of initiating and/or receiving the network flow over a network. Moreover, the flagged network flows may include the flagged network flows described above with respect to FIGS. 5A-B, but of course may include any other network flows that have been flagged.

For example, in a peer-to-peer system, a file may be split into a plurality of portions with multiple devices downloading and/or sharing the plurality of portions. Furthermore, a peer-to-peer client requesting a file may request different portions from different devices, which may show up as a series of network flows [e.g. transmission control protocol (TCP), etc.] initiated by the source to a plurality of different destinations.

In one example, if a peer-to-peer system is designed to be evasive to firewalls and network traffic shapers, only a source IP address may be common to multiple network flows, with the destination IP addresses, ports, source ports, etc. being different. In addition, in the context of the current example, the network flow may be obfuscated and/or encrypted.

As shown in decision 604, it is determined whether a predetermined amount of data associated with any number of different network flows has originated from a single source. Such determination may be based on a predefined time period, for example. Accordingly, a plurality of network flows may be identified as originating form a single source. For example, a determination that at least the predetermined amount of data associated with any number of different network flows has originated from a single source may indicate that the source is a peer-to-peer file sharing node associated with peer-to-peer file sharing flows.

In response to a determination that the predetermined amount of data associated with any number of different network flows has originated from a single source, it is determined whether the flagged network flows are associated with multiple different destination addresses. Note decision 606. For example, for peer-to-peer file transfers, multiple destination IP addresses may be utilized. Thus, a plurality of flagged network flows may be identified as having multiple different destinations.

In one embodiment, a plurality of flows connecting to the same destination may be counted as one flow. For example, a HTTP browser application may make multiple connections to the same node for network flows being communicated therebetween, and such multiple network flows may be identified as a single network flow.

If it is determined that the flagged network flows are associated with multiple different destination addresses, it is determined whether a number of network flows during a predefined threshold time period meet a threshold. Note decision 608. As an option, such threshold may be user defined, automatically defined, etc. Thus, a plurality of network flows may be identified as occurring within a predefined time period. For example, a number of flows (N) originating in a time period (P) from a source may be characteristic of a peer-to-peer file sharing node. Furthermore, the values for N and P may be configured by an administrator, read from a configuration file, dynamically determined, etc.

In addition, as shown in operation 610, in response to a determination that the number of network flows during a predefined threshold time period meets the threshold, a source of such network is flagged as a peer-to-peer file sharing node. To this end, a flagged network flow included in at least a predetermined threshold amount of flows originating from a single source, having multiple different destination nodes, and having at least a threshold number of network flows during a predetermined time period may be flagged as a peer-to-peer file sharing node.

Additionally, as shown in operation 612, a rate limit may be applied to a network flows associated with the flagged source. For example, network flows may be flagged as being associated with an identified peer-to-peer file sharing node. In another embodiment, the rate limit may be a configured by a network administrator. Still yet, in another embodiment, the rate limit may provide the network administrator with a plurality of rate limiting granularities for the flagged network flows.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method, comprising:
using a processor to identify a network flow as utilizing an unknown, potentially unwanted protocol by determining whether the network flow transfers at least a threshold amount of data and that the network flow is non-interactive; and
using a processor to flag the network flow that includes the unknown, potentially unwanted protocol; and
performing an action on the flagged network flow, wherein the action comprises at least one of applying a rate limit to the flagged network flow or performing an analysis on the flagged network flow.

2. The method of claim 1, wherein the threshold amount of data is transferred in a single direction.

3. The method of claim 1, wherein using a processor to identify a network flow as utilizing an unknown, potentially unwanted protocol further comprises determining that the network flow is excluded from a predetermined list of standard protocols.

4. The method of claim 3, wherein the predetermined list of standard protocols is manually determined by a user.

5. The method of claim 3, wherein the predetermined list of standard protocols is read from a configuration file.

6. The method of claim 1, wherein using a processor to identify a network flow as utilizing an unknown, potentially unwanted protocol further comprises determining that the network flow includes an unidentified byte pattern.

7. The method of claim 1, wherein using a processor to identify a network flow as utilizing an unknown, potentially unwanted protocol further comprises determining that the network flow includes non-ASCII characters.

8. The method of claim 1, wherein the rate limit is applied for a predetermined time period.

9. The method of claim 1, wherein the rate limit allows network traffic that is less than or equal to a predetermined rate to be sent while network traffic that exceeds the predetermined rate may be dropped or delayed.

10. The method of claim 9, wherein the threshold amount of data transfer involves a burst of equal-sized packets that equal a path-maximum transfer unit (MTU) of a route.

11. The method of claim 10, wherein a computer algorithm automatically calculates the path-MTU of the route.

12. The method of claim 1, wherein applying a rate limit to the flagged network flow further comprises applying a priority to the flagged network flow.

13. The method of claim 12, wherein the rate limit prioritizes the network flow that is flagged as potentially unwanted with a priority higher than flagged bad protocols and a priority lower than flagged good protocols.

14. The method of claim 1, wherein the non-interactive flow includes at least a portion of a file transfer.

15. The method of claim 1, wherein performing an analysis on the flagged network flow further comprises identifying a plurality of flagged network flows as originating from a single source.

16. The method of claim 1, wherein performing an analysis on the flagged network flow further comprises identifying a plurality of flagged network flows as having a plurality of different destinations.

17. The method of claim 1, wherein performing an analysis on the flagged network flow further comprises identifying a plurality of flagged network flows as occurring within a predefined time period.

18. The method of claim 1, wherein the network flow is flagged utilizing 802.1P tagging of each network packet of the network flow.

19. The method of claim 1, wherein the identifying includes determining whether a threshold portion of a beginning of the network flow includes a predetermined amount of non-printable characters.

20. A computer program product embodied on a non-transitory computer readable medium, comprising:
computer code for identifying a network flow as utilizing an unknown, potentially unwanted protocol by determining whether the network flow transfers at least a threshold amount of data and that the network flow is non-interactive; and
computer code for flagging the network flow that includes the unknown, potentially unwanted; and
computer code for performing an action on the flagged network flow, wherein the action comprises at least one of applying a rate limit to the flagged network flow or performing an analysis on the flagged network flow.

21. A system, comprising:
a processor for identifying a network flow as utilizing an unknown, potentially unwanted protocol by determining whether the network flow transfers at least a threshold amount of data and that the network flow is non-interactive, the processor further adapted to flag the network flow that includes the unknown, potentially unwanted protocol and perform an action on the flagged network flow, wherein the action comprises at least one of applying a rate limit to the flagged network flow or performing an analysis of the flagged network flow.

22. The system of claim 21, wherein the processor is coupled to memory via a bus.

* * * * *